April 18, 1933.  G. OLLENDORFF  1,903,937
PHOTOGRAPHIC ROLL FILM SPOOL
Filed Nov. 13, 1928
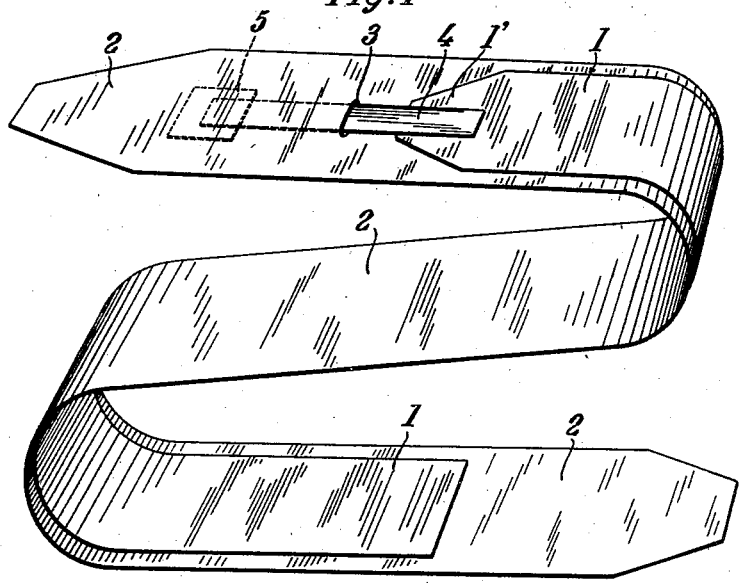
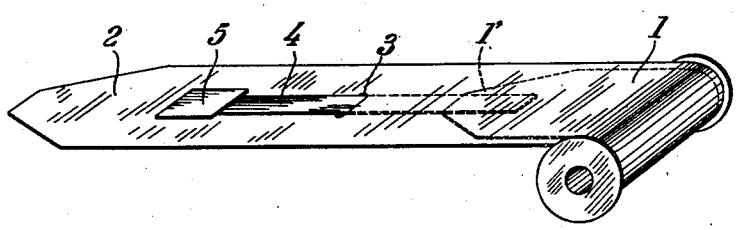
Inventor:
Gerhard Ollendorff,
By Attorneys Patented Apr. 18, 1933

1,903,937

UNITED STATES PATENT OFFICE

GERHARD OLLENDORFF, OF WOLFEN NEAR BITTERFELD, GERMANY, ASSIGNOR TO AGFA ANSCO CORPORATION, OF BINGHAMTON, NEW YORK, A CORPORATION OF NEW YORK

PHOTOGRAPHIC ROLL FILM SPOOL

Application filed November 13, 1928, Serial No. 319,171, and in Germany December 8, 1927.

The present invention relates to photographic film rolls or cartridges, more particularly to the manner in which the upper or leading end of the light sensitive film strip is attached to the protective paper-strip. Its object is to provide a film roll in which the film strip is always more tensioned than the paper strip, also at the beginning of winding in a photographic camera when loading it.

In photographic roll films the fastening of the light-sensitive strip is usually effected by attaching its leading end by means of a special adhesive strip or sticker to the protective paper-strip at a certain distance from the leading end of the latter. With this arrangement at the beginning of winding in a photographic camera a stronger pull is exerted on the paper than on the strip of film, and in consequence the film, especially in the case of a flanged spool with a small core, does not lie flat in its operative position.

I found that balance of the stresses exerted on the paper and on the strip of film can be obtained if a short length of the leading end of the film be passed through a slit or opening in the protective paper strip and be fastened at its extremity to the outer surface of the latter so that the protective paper strip and the film strip can slide over one another at the opening in the paper strip.

With this arrangement at the first few rotations of the winding spool a somewhat greater length of film than of paper is coiled, so that the paper is tensioned more slackly than the film. This difference of tension is later gradually balanced; the tension of the paper must, however, never be greater than that of the film and this is effected by providing a sufficient distance between the slit in the protective paper and the point where the film strip is secured to the surface of the latter.

The accompanying drawing shows a photographic roll film manufactured according to a preferred mode of carrying out the invention wherein the film strip is secured to the protective paper by means of an extension of material insensitive to light.

Fig. 1 is a perspective view of the film strip.

Fig. 2 is a perspective view of a roll of film embodying the invention, the leading end of the film strip being unwound from the roll.

The attachment of the leading end of the strip of film to the outer surface of the paper can, for example, be carried out by passing the leading end 1' of the film 1 through a slit 3 formed in the protective paper strip 2 and securing it in position on the outer surface of the paper strip by means of a sticking strip 5 or other suitable means. If desired the strip of film may also be provided with an extension 4 of material insensitive to light, this extension being passed through the slit in the protective paper strip and fastened to its outer surface.

The method of fastening strips of film described is particularly suitable for spools having a central portion of small diameter.

I claim:

1. A photographic roll film cartridge comprising a flanged spool with a core, a protective paper strip provided on its leading end with a slot, and a strip of light-sensitive photographic film with a tongue-like extension on its leading end, said film lying on the inner surface of the said protective paper strip and wound onto the spool with the latter, the tongue-like extension of said film being passed through said slot in the protective paper strip and fastened on the outer surface of the latter.

2. A photographic roll film cartridge comprising a flanged spool with a core, a protective paper strip provided on its leading end with a slot, and a strip of light-sensitive photographic film with a strip of material connected to the leading end of said film, said film lying on the inner surface of the said protective paper strip and wound onto the spool with the latter, the said strip of material connected to said film being passed through said slot in the protective paper strip and fastened on the outer surface of the latter.

3. A photographic roll film cartridge comprising a flange spool with a core, a protective paper strip provided on its leading end with a slot, and a strip of light-sensitive photographic film with a strip of material insensitive to light connected to the leading end of said film, said film lying on the inner surface of the said protective paper strip and wound onto the spool with the latter, the said strip of material insensitive to light connected to said film being passed through said slot in the protective paper strip and fastened on the outer surface of the latter.

In testimony whereof, I affix my signature.
GERHARD OLLENDORFF.